United States Patent [19]

Nishikawa et al.

[11] Patent Number: 4,650,047

[45] Date of Patent: Mar. 17, 1987

[54] DIRECT-COUPLING CONTROL SYSTEM FOR FLUID GEAR IN AUTOMATIC VEHICULAR TRANSMISSION

[75] Inventors: Masao Nishikawa, Tokyo; Takashi Aoki, Fujimi; Yoichi Sato, Wako, all of Japan

[73] Assignee: Honda Giken Kogyo Kabushiki Kaisha, Tokyo, Japan

[21] Appl. No.: 661,495

[22] Filed: Oct. 16, 1984

[30] Foreign Application Priority Data

Oct. 17, 1983 [JP]  Japan ................................. 58-193902

[51] Int. Cl.⁴ ........................ B60K 41/02; F16H 45/02
[52] U.S. Cl. ................................ 192/3.31; 192/0.076; 192/109 F; 74/733
[58] Field of Search ................... 192/3.31, 3.57, 0.076, 192/86, 103 R, 109 F; 74/730, 731, 732, 733, 645

[56] References Cited

U.S. PATENT DOCUMENTS 2,965,202 12/1955 Christenson ......................... 74/732
4,253,553 3/1981 Yamada et al. ............. 192/103 R X
4,457,413 7/1984 Hattori ........................... 192/3.31 X

FOREIGN PATENT DOCUMENTS 184352 10/1983 Japan.

Primary Examiner—George H. Krizmanich
Attorney, Agent, or Firm—Armstrong, Nikaido, Marmelstein & Kubovcik

[57] ABSTRACT

A direct-coupling control system for a fluid gear in an automatic vehicular transmission, having a fluid gear provided with input and output members; a direct-coupling mechanism capable of connecting the input and output members of the fluid gear mechanically and directly by a locking force which is determined on the basis of a function of a difference between a working pressure and an internal pressure in the fluid gear; and a control valves provided between a pressure supply source and the direct-coupling mechanism and adapted to control the working pressure. The direct-coupling control system includes a pressure retainer valve for controlling the internal pressure in the fluid gear so as to reduce the same in accordance with an increase in a vehicle speed or an engine output.

3 Claims, 5 Drawing Figures

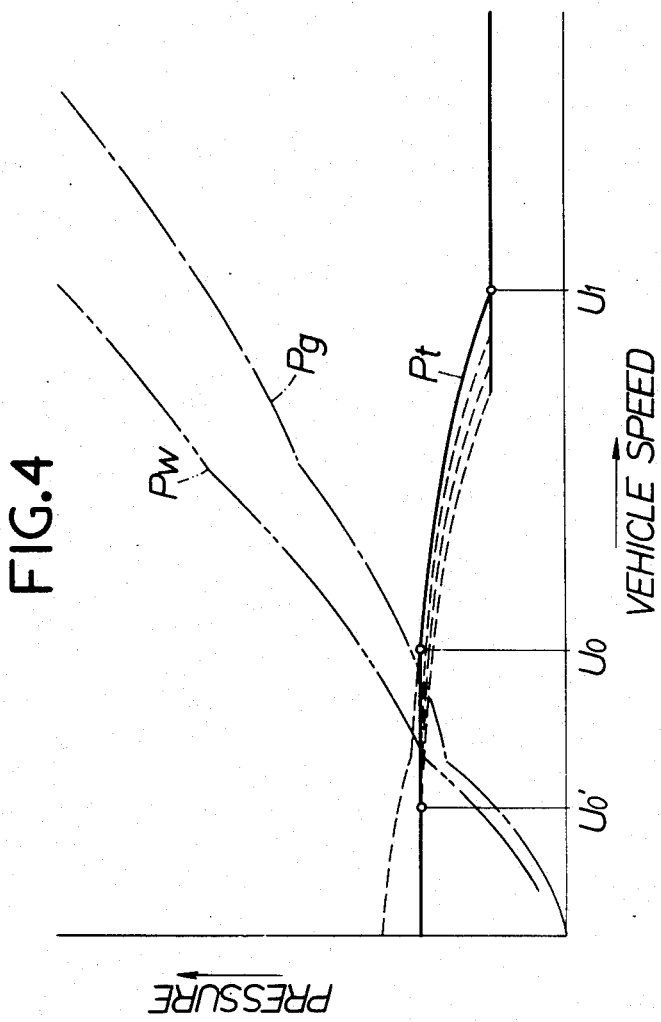

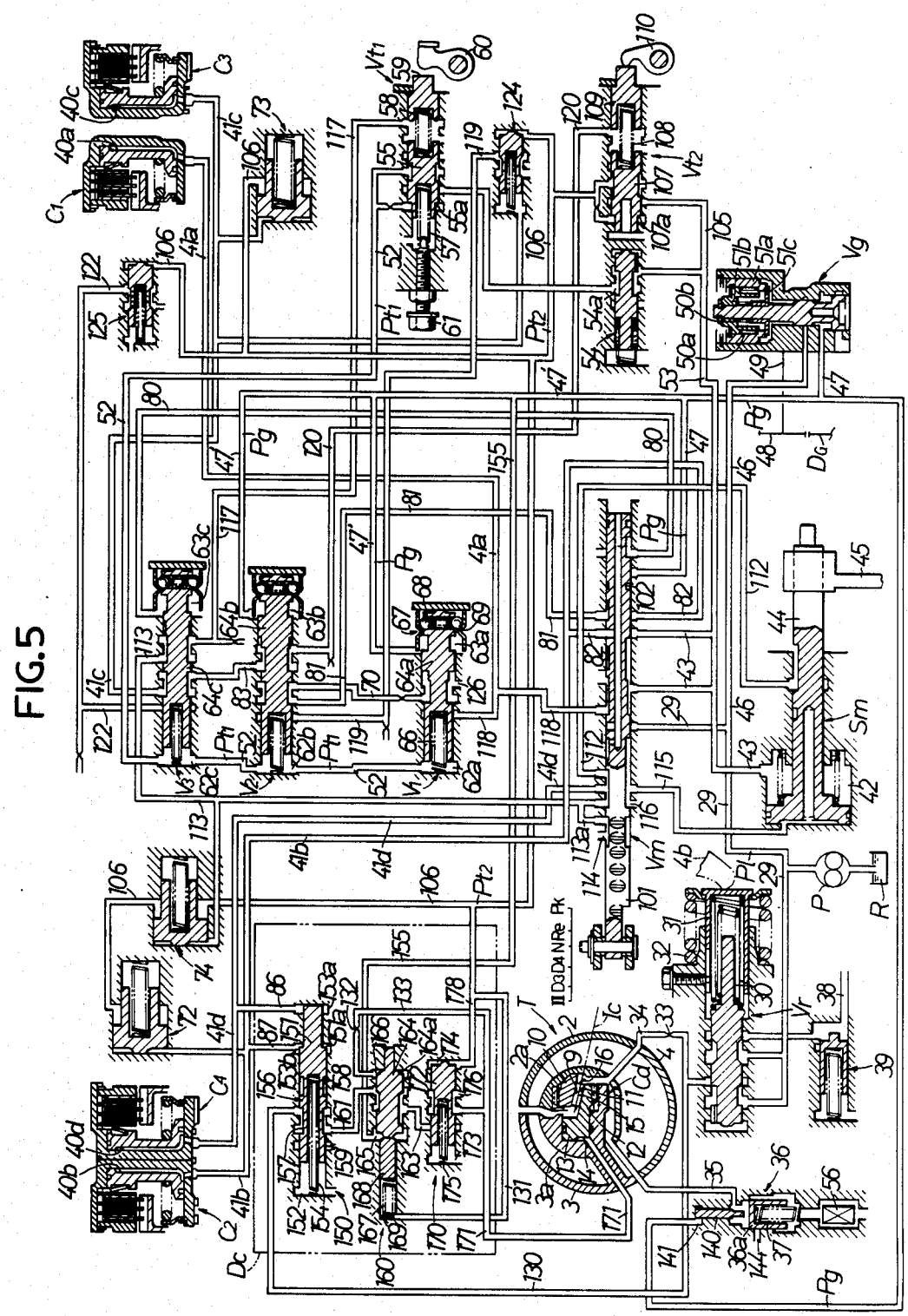

DIRECT-COUPLING CONTROL SYSTEM FOR FLUID GEAR IN AUTOMATIC VEHICULAR TRANSMISSION

BACKGROUND OF THE INVENTION

Field of the Invention:

This invention relates to a direct-coupling control system for a fluid gear, such as a torque converter and a fluid joint in an automatic vehicular transmission.

A direct-coupling mechanism provided between the input and output members of a torque converter as a fluid gear and adapted to couple the input and output members to each other when the mechanism is in operation, without permitting a slip to occur therebetween is known and generally used. When this direct-coupling mechanism is operated while the vehicle runs at a low speed, the vibration is liable to occur, and the torque-amplifying functions of the torque converter come to fail, so that the power performance is deteriorated. Therefore, the direct-coupling mechanism is controlled in practice so that it is operated at not lower than a predetermined vehicle speed. A direct-coupling mechanism adapted to apply the power to a torque converter and a mechanical system in a divided manner at a predetermined ratio is also known and generally used. However, this direct-coupling mechanism is generally expensive, and, moreover, a slip loss of the torque converter remains for an indefinite time, so that this direct-coupling mechanism does not contribute to the reduction of fuel cost.

In view of the above, the Assignee of this invention previously proposed a direct-coupling mechanism having the power dividing functions, capable of varying the power dividing ratio from 0% to 100% and consisting of a taper and a roller, and a method of controlling a power divided ratio by setting the thrust of a directcoupling mechanism variable. This direct-coupling mechanism is constructed so that it is operated by a differential pressure between the working pressure applied under control and the internal pressure in the torque converter. The Assignee previously proposed a direct-coupling mechanism which is adapted to increase the locking force thereof by reducing the internal pressure in the torque converter to a lower level when the vehicle speed is not less than a predetermined level. This direct-coupling mechanism has the following drawbacks. (a) One additional change-over valve is required. (b) The varying of the locking force is done by turning a switch on and off, and the driving feeling at the vehicle speeds around a predetermined level varies greatly. (c) It is difficult to vary the locking force with a factor other than a vehicle speed, for example, the degree of opening of a throttle. (d) When the internal pressure in the torque converter is low during the speed changing and coasting operations, the releasing of the direct-coupled state cannot be done smoothly.

When the level of an engine output is improved, and when the number of the speed changing steps of an auxiliary transmission is increased, the sufficient power performance can be obtained without relying much on the torque-amplifying functions of the toque converter. Accordingly, the main object of carrying out the division of power is to prevent the deterioration of vibration. Therefore, in a region in which, when the torque converter is directly coupled, vibration is apt to occur with the lowering of the commercial value of the direct-coupling mechanism predicted, for example, when the vehicle runs at a constant medium speed in an urban area, it is desirable that the dividing of power be done. Also, when an accelerator pedal is stepped from this region to enter into an accelerating operation, it is desirable that the power division control be done using the degree of opening of a throttle as a parameter so as not to increase the power flowing toward the torque converter.

SUMMARY OF THE INVENTION

An object of the present invention is to provide a direct-coupling control system for a fluid gear in an automatic vehicular transmission, which has been developed in view of the above facts, and which has a simple construction and is capable of controlling an operation of a direct-coupling mechanism continuously and smoothly and preventing the occurrence of vibration and the deterioration of the power performance.

The direct-coupling control system according to the present invention is provided with a means for controlling the internal pressure in a fluid gear so as to reduce the same in accordance with an increase in a vehicle speed or an engine output.

When the fluid gear is controlled so as to reduce the internal pressure therein in accordance with an increase in the vehicle speed, the operation of the direct-coupling mechanism can be controlled continuously and smoothly, so that a change-over valve employed in a conventional direct-coupling control system is not required.

When the fluid gear is controlled so as to reduce the internal pressure therein in accordance with an increase in the engine output, the occurrence of vibration and the deterioration of the power performance can be prevented.

The above and other objects, features and advantages of the present invention will become apparent from the following description of the preferred embodiments taken in conjunction with the accompanying drawings.

BRIEF DESCRIPTION OF THE DRAWINGS

FIGS. 1-4 illustrate an embodiment of the present invention, wherein:

FIG. 1 is a schematic diagram of an automatic transmission having four forward steps and one backward step, to which the present invention is applied:

FIG. 2 is a diagram of a hydraulic control circuit for the automatic transmission;

FIG. 3 is a development of a principal portion of a direct-coupling clutch shown in FIG. 2; and FIG. 4 is a characteristic diagram of the internal pressure in a torque converter.

FIG. 5 is a diagram of a hydraulic control circuit for another embodiment of the present invention.

DESCRIPTION OF THE PREFERRED EMBODIMENTS

Figure 1:
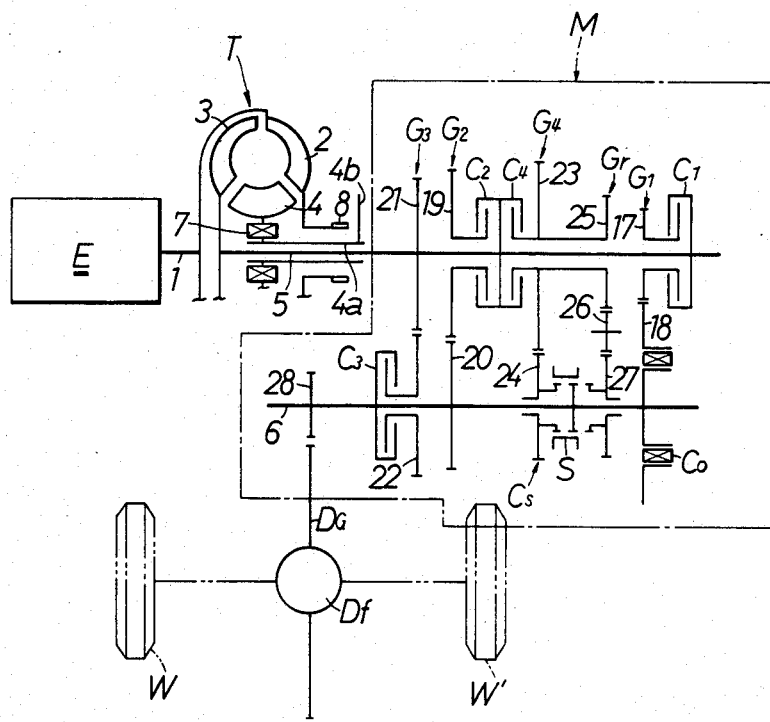

The embodiments of the present invention will now be described with reference to the drawings. First, referring to FIG. 1 which schematically illustrates an automatic transmission having four forward steps and one backward step for automobiles, to which the present invention is applied, an output from an engine E is tranmitted from its crankshaft 1 to driving wheels W, W' via a torque converter T, an auxiliary transmission M and a differential gear device Df in the mentioned order to drive the same wheels.

The torque converter T consists of a pump rotor 2 connected to the crankshaft 1, a turbine rotor 3 connected to an input shaft 5 in the auxiliary transmission M, and a stator rotor 4 connected via a one-way clutch 7 to a stator shaft 4a which is supported on the input shaft 5 so that the stator shaft 4a can be rotated relatively to the input shaft 5. The torque transmitted from the crankshaft 1 to the pump rotor 2 is sent to the turbine rotor 3 hydrodynamically. When a torque-amplifying operation is carried out during this time, the stator rotor 4 bears its reaction force in a known manner.

Figure 2:
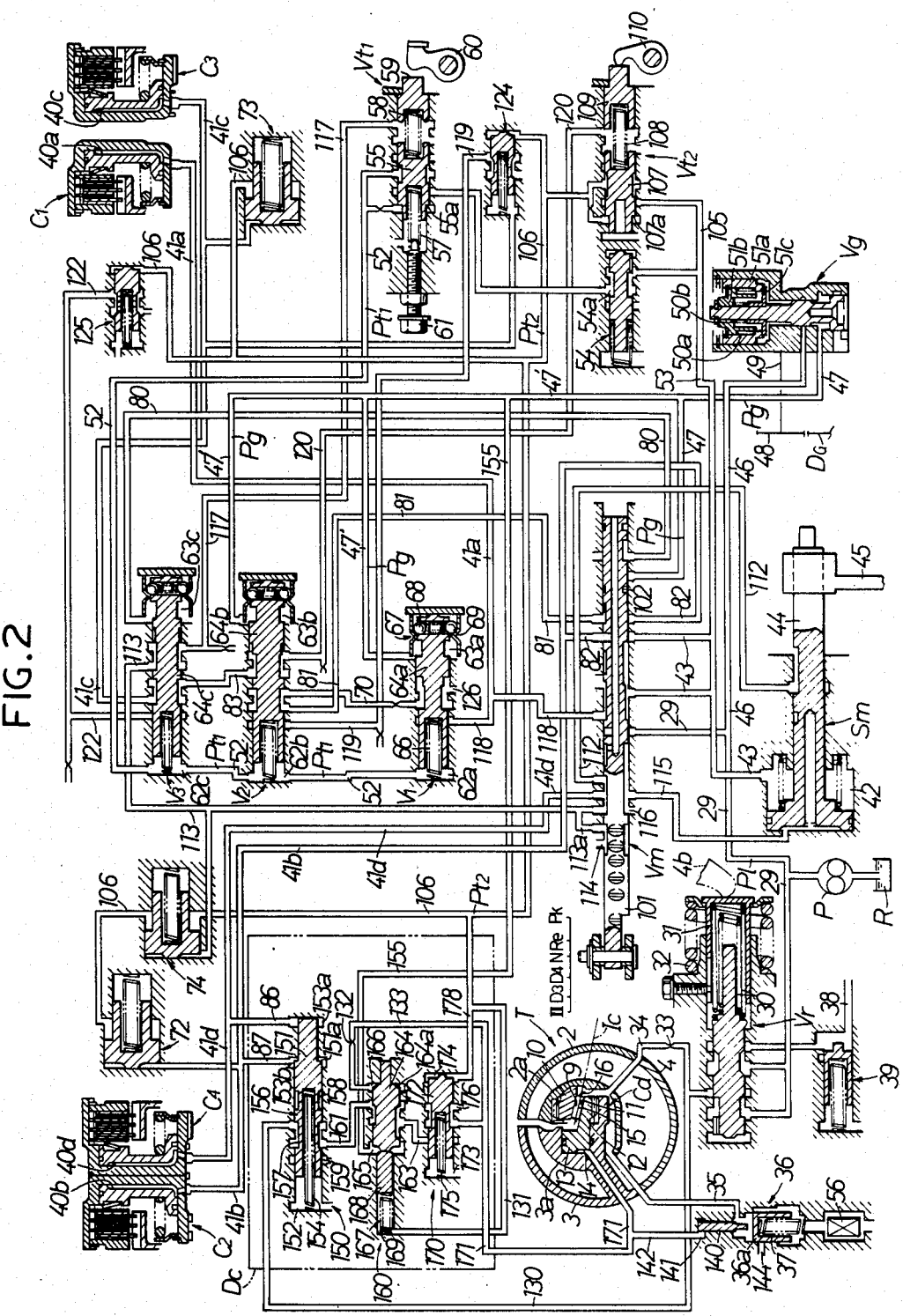

A gear 8 for driving a hydraulic pump P shown in FIG. 2 is provided at the right end of the pump rotor 2, and a stator arm 4b for controlling a regulator valve Vr shown in FIG. 2 is fixed to the right end of the stator shaft 4a.

Between the pump rotor 2 and turbine rotor 3, a roller type direct-coupling clutch Cd is provided, which is capable of connecting these rotors 2, 3 mechanically. This direct-coupling clutch Cd will now be described in detail with reference to FIGS. 2 and 3. An annular driving member 10 having a conical driving surface 9 on its inner circumferential side is spline-fitted to an inner circumferential wall 2a of the pump rotor 2. A driven member 12 having a conical driven surface 11, which is opposed to the conical driving surface 9 in parallel therewith, on its outer circumferential side is spline-fitted to an inner circumferential wall 3a of the turbine rotor 3 so that the driven member 12 can be slided in its axial direction. At one end of this driven member 12, a piston 13 is formed integrally therewith, which is fitted slidably in a hydraulic cylinder 14 provided in the inner circumferential wall 3a of the turbine rotor 3, and which is adapted to receive the internal pressures in the cylinder 14 and torque converter T at its left and right end surfaces simultaneously.

Figure 3:
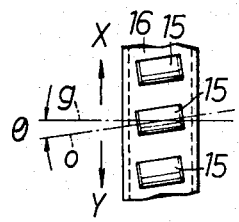

Between the conical driving and driven surfaces 9, 11, cylindrical clutch rollers 15 are inserted, which are held on an annular retainer 16 so that, as shown in FIG. 3, the center axis o of each clutch roller 15 is inclined at a predetermined angle $\theta$ with respect to the generatrix g of an imaginary conical surface Ic (FIG. 2) which extends parallel to and between these conical surfaces 9, 11.

Accordingly, when a hydraulic pressure higher than the internal pressure in the torque converter is introduced into the hydraulic cylinder 14 in the stage of an operation of the vehicle in which the torque-amplifying functions of the torque converter T become unnecessary, the piston 13, i.e. the driven member 12 is urged toward the driving member 10. Consequently, the clutch rollers 15 engage under pressure with the conical surfaces 9, 11. When the driving member 10 is then turned due to the output torque of the engine in the X-direction in FIG. 3 with respect to the driven member 12, the clutch rollers 15 rotate around their own axes. Since the center axis o of each clutch roller 15 is inclined as mentioned above, the rotation of the clutch rollers 15 around their own axes causes the members 10, 12 to be displaced relatively to each other in the axial direction thereof in such a manner that these members 10, 12 come close to each other. As a result, the clutch rollers 15 bite into the conical surfaces 9, 11 to mechanically connect the members 10, 12, i.e. the pump rotor 2 and turbine rotor 3 together. When the output torque from the engine E exceeds the coupling force of the direct-coupling clutch Cd to be applied between the two rotors 2, 3 even during such an operation of the direct-coupling clutch Cd, the clutch rollers 15 slide on the conical surfaces 9, 11, and this torque is divided in two. A part of the torque is transmitted mechanically via the direct-coupling clutch, and the remaining torque hydrodynamically via the two rotors 2, 3. Thus, a variable power drividing system is formed, in which a ratio of the former torque to the latter varies depending upon the degree of sliding of the clutch rollers 15.

When a reverse load is applied to the torque converter T during an operation of the direct-coupling clutch Cd, the rotational speed of the driven member 12 becomes higher than that of the driving member 10, so that the driving member 10 is rotated relatively to the driven member 12 in the Y-direction. Consequently, the clutch rollers rotate around their own axes in the direction which is opposite to the above-mentioned direction to cause the two members 10, 12 to be displaced relatively to each other in the axial direction thereof in such a manner that these members 10, 12 are separated from each other. As a result, the clutch rollers 15 are released from the two conical surfaces 9, 11 to be put in a floatingly-rotated state. Accordingly, the transmission of a reverse load from the turbine rotor 3 to the pump rotor 2 is done hydrodynamically only.

When the hydraulic pressure in the hydraulic cylinder 14 is released, the piston 13 receives the internal pressure in the torque converter T to move back to its initial position, so that the direct-coupling clutch Cd is put in a non-operated state.

Referring to FIG. 1 again, a first-speed gear train $G_1$, a second-speed gear train $G_2$, a third-speed gear train $G_3$, a fourth-speed gear train $G_4$ and a reverse gear train Gr are arranged in parallel with one another between the parallel-extending input and output shafts 5, 6 in the auxiliary transmission M. The first-speed gear train $G_1$ consists of a driving gear 17 connected to the input shaft 5 via a first-speed clutch $C_1$, and a driven gear 18 meshed with the gear 17 and capable of being connected to the output shaft 6 via a one-way clutch Co. The second-speed gear train $G_2$ consists of a driving gear 19 capable of being connected to the input shaft 5 via a second-speed clutch $C_2$, and a driven gear 20 mounted fixedly on the output shaft 6 and meshed with the gear 19. The third-speed gear train $G_3$ consists of a driving gear 21 mounted fixedly on the input shaft 5, and a driven gear 22 connected to the output shaft 6 via a third-speed clutch $C_3$ and capable of being meshed with the gear 21. The fourth-speed gear train $G_4$ consists of a driving gear 23 connected to the input shaft 5 via a fourth-speed clutch $C_4$, and a driven gear 24 connected to the output shaft 6 via a change-over clutch Cs and meshed with the gear 23. The reverse gear train Gr consists of a driving gear 25 provided integrally with the driving gear 23 of the fourth-speed gear train $G_4$, a driven gear 27 connected to the output shaft 6 via a change-over clutch Cs, and an idle gear 26 meshed with these two gears, 25, 27. The change-over clutch Cs is provided between the driven gears 24, 27. When a selector sleeve S for the clutch Cs is shifted to an advance position on the left side in the drawing or a reverse position on the right side therein, the driven gears 24, 27 can be selectively connected to the output shaft 6. The one-way clutch Co is adapted to transmit only the driving torque from the engine E, and does not transmit the torque sent thereto in the opposite direction.

When the first-speed clutch $C_1$ along is connected in the case where the selector sleeve S is held in the advance position as shown in the drawing, the driving gear 17 is connected to the input shaft 5 to establish the first-speed gear train $G_1$, via which the torque is transmitted from the input shaft 5 to the output shaft 6. When the second-speed clutch $C_2$ is then connected with the first-speed clutch $C_1$ kept connected, the driving gear 19 is connected to the input shaft 5 to establish the second-speed geear train $G_2$, via which the torque is transmitted from the input shaft 5 to the output shaft 6. During this time, the first-speed clutch $C_1$ is also engaged but a second speed, not a first speed, is obtained owing to the operation of the one-way clutch Co. The same applies to the establishment of the third and fourth speed gear trains. When the second-speed clutch $C_2$ is released to connect the third-speed clutch $C_3$, the driven gear 22 is connected to the output shaft 6 to establish the third-speed gear train $G_3$. When the third-speed clutch $C_3$ is released to connect the fourth-speed clutch $C_4$, the driving gear 23 is connected to the input shaft 5 to establish the fourth-speed gear train $G_4$. When the selector sleeve S for the change-over clutch Cs is moved to right to connect the fourth-speed clutch $C_4$ alone, the driving gear 25 is connected to the input shaft 5, and the driven gear 27 to the output shaft 6 to establish the reverse gear train Gr. Consequently, the reverse torque is transmitted from the input shaft 5 to the output shaft 6 via the gear train Gr.

The torque transmitted to the output shaft 6 is sent from an output gear 28 mounted on an end portion thereof to a large-diameter gear $D_G$ in the differential gear device Df.

Referring to FIG. 2, the hydraulic pump P is adapted to such up an oil from an oil tank R to send the same under pressure into a working oil passage 29. The pressure of this pressure oil is regulated to a predetermined level by the regulator valve Vr, and the pressure oil is then sent to a manual valve Vm which serves as a manual change-over valve. This hydraulic pressure is called "line pressure Pl".

The regulator valve Vr has a pressure-regulating spring 30, and a spring-receiving cylinder 31 for supporting the outer end of the pressure-regulating spring 30. This spring-receiving cylinder can be moved to right and left to regulate a set load of the spring 30. The stator arm 4b mentioned above contacts the outer surface of the spring-receiving cylinder 31 so as to apply thereto the reaction force working on the stator rotor 4, i.e. the stator reaction force. A stator spring 32 for bearing the stator reaction force is connected to the spring-receiving cylinder 31. Therefore, when the stator reaction force increases, the stator spring 32 contracts, so that the spring-receiving cylinder 31 moves to left to cause the set load of the pressure-regulating spring 30 to increase and the line pressure Pl in the working oil passage 29 to thereby increase.

A part of the pressure oil, the pressure of which has been regulated by the regulator valve Vr, is introduced into the torque converter T via an inlet passage 34 having a restriction 33 to apply the pressure to the interior thereof for preventing the occurrence of cavitation therein. An outlet passage 35 for the torque converter T is provided therein with a pressure retainer valve 36 as an internal pressure control means. The oil passing through this pressure retainer valve returns to the oil tank R via an oil cooler 56.

The excess portion of the pressure oil discharged from the hydraulic pump P is introduced from the regulator valve Vr into a lubricating oil passage 38, from which the oil is sent to each part to be lubricated. In order to secure a required minimum level of hydraulic pressure during this time, a pressure regulator valve 39 is connected to the lubricating oil passage 38.

The manual valve Vm is operatively connected to a change lever (not shown), and capable of being shifted to six positions, i.e. a parking position Pk, a reverse position Re, a neutral position N, a position $D_4$ for automatically changing four advance speeds, a position $D_3$ for automatically changing three advance speeds except a fourth speed, and a second speed retaining position II. When this manual valve Vm is in the neutral position N in the drawing, the pressure oil sent thereto does not flow to any of the clutches $C_1$, $C_2$, $C_3$, $C_4$ and various kinds of hydraulically operated parts. Accordingly, all of the four clutches $C_1$, $C_2$, $C_3$, $C_4$ are in a non-engaged state, and the torque from the engine E is not transmitted to the driving wheels W, W'.

When the manual valve Vm is shifted by one step from the neutral position N in the drawing to the position $D_4$ for automatically changing four advance speeds, the working oil passage 29 extending from the hydraulic pump P communicates with the oil passages 43, 118, and a working oil passage 41a, which communicates with a hydraulic cylinder 40a in the first-speed clutch $C_1$, with the oil passage 29 via the oil passage 118. An oil passage 47 communicates with an oil passage 80, and an oil passage 81 with an oil passage 82 which in turn communicates with a hydraulic cylinder 40b in the second-speed clutch $C_2$. The oil passages 113a, 113 are isolated from a discharge oil passage 114 and an oil passage 112, and an oil passage 115 communicates with a discharge port 116. The oil passage 43 communicates with a spring chamber 42 in a servomotor Sm which is used to shift the selector sleeve S (refer to FIG. 1). Accordingly, a piston 44 in the servomotor Sm is held in the left-hand position in the drawing to retain the selector sleeve S in the advance position, in which the selector sleeve S is in the condition shown in FIG. 1, via a shift fork 45. Consequently, the driven gear 24 engages with the output shaft 6, and the driven gear 27 is rendered floatingly rotatable around the output shaft 6, the reverse gear train Gr being put in a non-operated state.

When the manual valve Vm is shifted to the position $D_3$ for automatically changing three advance speeds, the communication and isolation of the oil passages are done in the same manner as those when the manual valve Vm is shifted to the four-step advance speed changing position $D_4$, except that the oil passage 80 is isolated from the oil passage 47. The oil passages 81, 82 which are seemingly isolated from each other communicate with each other via an annular groove 102 provided in a spool valve body 101 of the manual valve Vm.

An input oil passage 46 communicating with an input port of a governor valve Vg branches from the working oil passage 29 which communicates with the hydraulic pump P, and an oil passage 47 extends from an output port of the valve Vg. The governor valve Vg is of a known construction, and adapted to rotate around its own rotary shaft 49 owing to a gear 48 meshed with the large-diameter gear $D_G$ of the differential gear device Df. Consequently, the centrifugal force is applied to three weights 51a, 51b, 51c to urge the same in the valve-opening direction. These weights are normally urged in the valve-closing direction by the hydraulic pressure from the oil passage 47, but there are provided a pair of spring 50a, 50b which urges the valve in the opening direction for displaying the desirable characteristics of the governor valve Vg. According to this governor valve Vg, a hydraulic pressure proportional to a vehicle speed, i.e. a governor pressure Pg can be outputted into the oil passage 47.

An oil passage 53 branches from the oil passage 43 on which the hydraulic pressure from the hydraulic pump P works when the manual valve Vm is in the position $D_4$ for automatically changing four advance speeds and the position $D_3$ for automatically changing three advance speeds. This oil passage 53 is connected to a first throttle valve $Vt_1$ via a modulator valve 54, and to a second throttle valve $Vt_2$ via an oil passage 105.

The modulator valve 54 is a reducing valve, which is adapted to be urged in the closing side by the spring force and in the opening side by the modulator pressure from an output port 54a. The modulator valve 54 is adapted to determine an upper limit of the input pressure for the first throttle valve $Vt_1$.

The first throttle valve $Vt_1$ is of a known construction and has a spool valve body 55, a control spring 58 urging the valve body 55 to left, a return spring 57 urging the valve body 55 to right, a control piston 59 supporting the outer end of the control spring 58, a control cam 60 adapted to be turned in accordance with an increase in the degree of opening of the throttle valve in the engine E, and move the control piston 59 to left, and an adjusting bolt 61 capable of regulating a set load of the return spring 57. When the control piston 59 is moved to left, the displacement thereof is transmitted to the spool body 55 via the control spring 58 to press the spool body 55 to left. The hydraulic pressure outputted into the oil passage 52 in accordance with the leftward movement of the spool valve body 55 works on a left shoulder 55a so as to push back the spool valve body 55. Therefore, a hydraulic pressure proportional to the degree of opening of the throttle valve in the engine E, i.e. a first throttle pressure $Pt_1$ is outputted from the first throttle valve $Vt_1$ into the oil passage 52. The counter-clockwise pivotal movement of the control cam 60 causes the degree of the communication between a drain oil passage 117 and the oil tank R to be lowered continuously.

The second throttle valve $Vt_2$ is provided between the oil passages 105, 106, and has a spool valve body 107, a control spring 108 urging the valve body 107 to left, a control piston 109 supporting the outer end of the control spring 108, and a control cam 110 adapted to be turned in accordance with an increase in the degree of opening of the throttle valve in the engine E and move the control piston 109 to left. When the control piston 109 is moved to left, the displacement thereof is transmitted to the spool valve body 107 via the control spring 108, so that the spool valve body 107 is moved to left. The hydraulic pressure outputted into the oil passage 106 in accordance with the leftward movement of the spool valve body 107 works on a left shoulder 107a of the spool valve body 107 so as to push back the same valve body 107 in the rightward direction. Through such an operation, a second throttle pressure $Pt_2$ proportional to the degree of opening of the throttle valve in the engine E is outputted from the second throttle valve $Vt_2$ into the oil passage 106.

The oil passage 52, into which the first throttle pressure $Pt_1$ is introduced from the first throttle valve $Vt_1$, communicates with first pilot hydraulic pressure chambers 62a, 62b, 62c in the 1-2 shift valve $V_1$, 2-3 shift valve $V_2$ and 3-4 shift valve $V_3$, respectively. An oil passage 47′, which branches from the oil passage 47 into which the governor pressure Pg is introduced from the governor valve Vg, communicates with second pilot hydraulic chambers 63a, 63b in the 1-2 shift valve $V_1$ and 2-3 shift valve $V_2$, respectively. When the manual valve Vm is in the position $D_4$ for automatically changing the four-step advance speed, the oil passage 80 which can communicate with the oil passage 47 via the manual valve Vm communicates with a second pilot hydraulic chamber 63c in the 3-4 shift valve $V_3$. Accordingly, each of spool valve bodies 64a, 64b, 64c of the shift valves $V_1$, $V_2$, $V_3$ receives the governor pressure Pg and the first throttle pressure $Pt_1$ at both ends thereof to be operated in the following manner.

Namely, the spool valve body 64a in the 1-2 shift valve $V_1$ is initially held in the right-hand position in the drawing due to the force of the spring 66, and the oil passage 118 is disconnected from th oil passage 70. Since the oil passage 118 communicates with the working oil passage 41a at this time, the first-speed clutch $C_1$ is engaged under pressure. Consequently, the first-speed gear train $G_1$ is established.

When the vehicle speed then increases to cause the governor pressure Pg to become higher, and the leftward force of movement of the spool valve body 64a due to the governor pressure Pg to overcome the rightward force of movement thereof due to the first throttle pressure $Pt_1$ and the force of the spring 66, click balls 68 which move with the valve body 64a in a click motion mechanism 67 provided at the right end portion thereof run over a fixed positioning projection 69. As a result, the valve body 64a is shifted to the left-hand position, and the oil passage 118 communicates with the oil passage 70. The oil passage 70 is shut off from a drain oil passage 126. If the 2-3 shift valve $V_2$ is in the position shown in the drawing, at this time, the oil passage 70 communicates with the oil passage 81 which in turn communicates with the oil passage 82. Since this oil passage 82 communicates with the working oil passage 41b which leads to the hydraulic cylinder 40b in the second-speed clutch $C_2$, the clutch $C_2$ is engaged under pressure, so that the second-speed gear train $G_2$ is established.

When the vehicle speed further increases, the spool valve body 64b moves to left in the 2-3 shift valve $V_2$ to cause the oil passage 81 to communicate with a drain oil passage 119, the oil passage 70 to communicate with the oil passage 83, and the oil passage 83 to be shut off from the oil passage 120. The second-speed clutch $C_2$ is thereby disengaged. On the other hand, when the 3-4 shift valve $V_3$ is in the position shown in the drawing, the oil passage 83 communicates with the working oil passage 41c. Since this working oil passage 41c communicates with the hydraulic cylinder 40c in the third-speed clutch $C_3$, the clutch $C_3$ is engaged under pressure, so that the third gear train $G_3$ is established.

When the vehicle speed further increases in the case where the manual valve Vm is in the position $D_4$ for automatically changing the four-step advance speed, the spool valve body 64c moves to left since the governor pressure Pg works on the second pilot hydraulic chamber 63c in the 3-4 shift valve $V_3$ via the oil passage 80. Consequently, the working oil passage 41c communicates with a drain oil passage 122, and the third-speed clutch $C_3$ is disengaged. At the same time, the oil passage 113 is shut off from the drain oil passage 117 to communicate with the oil passage 83. The oil passage 113 communicates with the working oil passage 41d via the manual valve Vm, and the working oil passage 41d with the hydraulic cylinder 40d in the fourth-speed clutch C4. Accordingly, the fourth-speed clutch C4 is engaged under pressure, and the fourth-speed gear train G4 is estalished.

When the manual valve Vm is in the position D3 for automatically changing the three-step advance speed, the oil passage 80 is shut off from the oil passage 47 due to the manual valve Vm. Therefore, the force for moving the spool valve body 64c to left is not applied thereto. Accordingly, the fourth-speed clutch C4 is not engaged, so that the fourth-speed gear train G4 is not established.

In order to lessen the shock occurring when the speed is changed, accumulators 72, 73, 74 are provided. The drain passage 119 is provided therein with a 1-2 orifice control valve 124, and the drain oil passage 122 with a 2-3 orifice control valve 125.

When the engine is decelerated, the spool valve bodies 64c, 64b, 64a in the 3-4 shift valve V3, 2-3 shift valve V2 and 1-2 shift valve V1 move to right in the mentioned order. When the engine is stopped, the vehicle speed returns to the first speed. When the manual valve Vm is in the second-speed retaining position II, the oil passage 118 is shut off from the oil passage 29 and communicates with the oil tank R, while the oil passage 82 communicates with the oil passage 43 via the annular groove 102, the second-speed clutch C2 alone being engaged under pressure to retain the second speed. When the manual valve Vm is in the reverse position Re, the oil passage 43 communicates with the oil tank R, and the oil passage 115 is shut off from the discharge oil passage 116 to and communicates with the oil passage 29 to apply pressure to the spring chamber 42 in the servomotor Sm. Accordingly, the piston 44 moves to right to cause the selector sleeve S (refer to FIG. 1) to move in the same direction, so that the reverse gear train Gr is established. As a result, the hydraulic pressure in the oil passage 112 increases to be introduced into the working oil passage 41d via the manual valve Vm, so that the fourth-speed clutch C4 is engaged under pressure to cause the vehicle to move back.

The construction of means Dc for controlling the working pressure for the direct-coupling clutch Cd will now be described with reference to FIG. 2. This working pressure control means Dc is provided with three valves 150, 160, 170. These three valves 150, 160, 170 have only to be connected in series, and the order of connecting them does not matter.

The valve 150 is a valve for use in unlocking the direct-coupling clutch when the speed is changed, and has a spool valve body 151 adapted to be moved between a first shift position on the right-hand side and a second shift position on the left-hand side, a first pilot hydraulic chamber 152 which the left end surface of the valve body 151 faces, a second pilot hydraulic chamber 153a which the right end surface of the valve body 151 faces, a third pilot hydraulic chamber 153b which a stepped portion 151a facing the right-hand portion of the valve body 151 faces, and a spring 154 urging the valve body 151. The first pilot hydraulic chamber 152 communicates with the oil tank R, and the oil passage 86, which branches from the working oil passages 41d extending to the fourth-speed clutch C4, with the second pilot hydraulic chamber 153a. The oil passage 87, which branches from the working oil passage 41b extending to the second-speed clutch C2, communicates with the third pilot hydraulic chamber 153b. The area of the pressure-receiving surface, which faces the second pilot hydraulic chamber 153a, of the valve body 151 and that of the pressure-receiving surface, which faces the third pilot hydraulic chamber 153b, of the same valve body are set substantially equal. The valve body 151 is provided in its outer circumferential surface with left and right, symmetric, annular grooves 157, 158 which sandwich a land 156. When the valve body 151 is in the first shift position as shown in the drawing, the oil passage 130, into which the pressure oil as having been regulated its pressure by the regulator valve Vr is introduced, communicates with an output oil passage 161 leading to the valve 160. This condition of the oil passages 130, 161 is not changed even when the valve body 151 is in the second shift position on the left-hand side. However, when the valve body 151 is being moved between the first and second shift positions, the output oil passage 161 is shut off from the oil passage 130 for a short time to communicate with an oil passage 159 joined to the oil tank R.C.

The valve 160 is a modulator valve provided between the output oil passage 161 and an oil passage 163 and having a spool valve body 164, which is adapted to be moved between a closing position on the left-hand position and an opening position on the right-hand position, a first pilot hydraulic chamber 165 which the left end surface of the valve body 164 faces, a second pilot hydraulic chamber 166 which a right shoulder 164a at the right end portion of the valve body faces, a plunger 168 projecting into the first pilot hydraulic chamber 165 to contact the valve body 164, a third pilot hydraulic chamber 169 facing the left end surface of the plunger 168, and a spring 167 held in the third pilot hydraulic chamber 169. The oil passage 155 for introducing the governor pressure Pg from the governor Vg communicates with the first pilot hydraulic chamber 165. Accordingly, the governor pressure Pg is introduced into the first pilot hydraulic chamber 165. The oil passage 131, which branches from the oil passage 106 for introducing the second throttle pressure Pt2 from the second throttle valve Vt2, communicates with the third pilot hydraulic chamber 169. Accordingly, the second throttle pressure Pt2 is applied to the third pilot hydraulic chamber 169. The second pilot hydraulic chamber 166 further communicates with an oil passage 171, which is used to introduce the working hydraulic pressure to the direct-coupling clutch Cd, via the oil passage 133 provided with the restriction 132 therein. Therefore, the working hydraulic pressure is introduced to the direct-coupling clutch Cd from the second pilot hydraulic pressure 166.

The oil passage 163 may be arranged so as to communicate with the second pilot hydraulic chamber 166. The spring 167 is used to correct the locking force of the direct-coupling clutch Cd, and may be provided as necessary. When the locking force is too large, the spool valve body 164 is so provided in some cases that it is urged in the valve-opening direction.

In this modulator valve 160, the spool valve body 164 makes a valve-opening action in proportion to the degree of opening of the throttle, i.e. the second throttle pressure Pt2. When the second throttle pressure Pt2 is lower than the governor pressure Pg, the plunger 168 is removed from the spool valve body 164, so that the spool valve body 164 is not influenced by the second throttle pressure Pt2.

The valve 170 is provided between the oil passage 163 and the oil passage 171 communicating with the hydraulic cylinder 14 in the direct-coupling clutch Cd, and includes a spool body 172 movable between a closing position on the right-hand side and an opening position on the left side, a first pilot hydraulic chamber 173 which the left end surface of the valve body 172 faces, a second pilot hydraulic chamber 174 which the right end surface of the valve body 172 faces, and a spring 175 urging the valve body 17 in the valve-closing direction. The first pilot hydraulic chamber 173 communicates with the oil tank R, and the second pilot hydraulic chamber 174 with the oil passage 106 via an oil passage 178. When the pressure in the second pilot hydraulic chamber 174, i.e. the second throttle pressure $Pt_2$ in the valve 170 is lower than the force of the spring 175, the valve 170 is closed as shown in the drawing, to cause the hydraulic pressure in the hydraulic cylinder 14 in the direct-coupling clutch Cd to flow into the oil tank R via the oil passage 171 and a release port 176. When the second throttle pressure $Pt_2$ overcomes the force of the spring 175, the valve body 172 moves to left to cause the input oil passage 163 to communicate with the oil passage 171, and the direct-coupling clutch Cd to be operated. Thus, when the throttle is in the idling position, the valve 170 works to disengage the direct-coupling clutch Cd, i.e. unlock the same.

In the pressure retainer valve 36 provided in the outlet oil passage 35 which connects the torque converter T and oil tank R together, the valve body 36a therein is urged in the valve-closing direction by the spring 37 as an urging member and in the valve-opening direction by the pressure from the upstream side of the outlet oil passage 35, i.e. the internal pressure in the torque converter T. Moreover, the plunger 140, which can be engaged with the upstream end portion (upper end portion in FIG. 2) of the valve body 36a, is provided so as to press the valve body 36a in the valve-opening direction. The oil passage 142 branching from the oil passage 171, which is used to introduce the working hydraulic pressure into the direct-coupling clutch Cd, communicates with a pressure working chamber 141 to which that end portion of the plunger 140 located on the opposite side of the valve body 36a faces.

The operation of this embodiment will now be described. In the direct-coupling clutch Cd, the locking force thereof is determined in accordance with a difference between the working hydraulic pressure from the oil passage 171 and the internal pressure in the torque converter T. Accordingly, during a high-speed operation of the vehicle, in which the locking force of the clutch Cd requires to be increased, it is desirable to reduce the internal pressure in the torque converter T. In order to meet these requirements, the pressure retainer valve 36 is opened to reduce the internal pressure in the torque converter T when the vehicle speed increases. Namely, when the vehicle speed increases to a sufficiently high level to cause the pressure in the oil passage 171 to increase, the valve body 36a in the retainer valve 36 is pressed down by the plunger 140, so that the valve 36 is opened. Consequently, the internal pressure in the torque converter T decreases, and the locking force of the direct-coupling clutch Cd further increases. While the direct-coupling clutch Cd is in such a condition, the quantity of heat generated in the torque converter T is extremely small, so that the necessity of cooling the torque converter T with an oil cooler 56 decreased. When the valve body 36a in the pressure retainer valve 36 is further pressed down, the greater part of the oil from the torque converter T is discharged directly into the oil tank R via the discharge oil passage 144. When the throttle pedal is then returned to the idling position or when the speed is then changed, it is necessary that the direct-coupling clutch Cd be unlocked. The unlocking of the direct-coupling clutch Cd can be done by pushing back the piston 13 by the internal pressure in the torque converter T. Therefore, if the internal pressure in the torque converter T remains to be low, inconveniences occur to prevent the responding ability of the direct-coupling clutch Cd with respect to the clutch-unlocking operation from being improved. Since the pressing force of the plunger 140 stops being applied to the valve body 36a in the pressure retainer valve 36 in accordance with a decrease in the hydraulic pressure in the oil passage 171, the internal pressure in the converter T increases, and the unlocking of the clutch Cd can be done reliably. Since the valve body 36a and plunger 140 are separately formed, the pressure in the oil passage 171 does not exceed that in the space above the valve body 36a until the vehicle speed reaches a predetermined level, so that the internal pressure in the torque converter T can be kept at a high predetermined level.

The characteristics of the internal pressure in the torque converter T, which are based on such operations of the pressure retainer valve 36 and plunger 140, are as shown in FIG. 4. Referring to FIG. 4, the two-dot chain line represents the working hydraulic pressure Pw in the oil passage 171 during the time in which the degree of opening of the throttle corresponds to the idling position, the one-dot chain line the governor pressure Pg, and the full line the internal pressure PT in the torque converter T.

When the degree of opening of the throttle corresponds to the idling position, the governor pressure Pg increases in proportion to an increase in the vehicle speed, and also working pressure Pw in the oil passage 171 in production to the governor pressure Pg. When the vehicle speed exceeds $U_O$, the plunger 140 starts pressing the valve body 36a in the pressure retainer valve 36 in the valve-opening direction. The internal pressure PT in the torque converter then decreases gradually as the pressing force of the plunger 140 increases due to an increase in the working pressure Pw. When the vehicle speed $U_1$ is attained, the pressure retainer valve 36 is opened, and the internal pressure PT in the torque converter T becomes constant. Since the internal pressure PT in the troque converter T thus decreases continuously as the vehicle speed increases, the operation of the direct-coupling clutch Cd can be controlled very smoothly.

The internal pressure PT varies as shown by the broken line in accordance with the degree of opening of the throttle. In a full-throttle condition, the vehicle speed at which the internal pressure PT starts decreasing changes from $U_O$ to $U_O'$.

In another mode of embodiment of the present invention, the governor pressure Pg may be used as shown in FIG. 5, as the pressure introduced into the pressure working chamber 141, instead of the working pressure Pw. The throttle pressure $Pt_1$ or $Pt_2$ may also be applied to the pressure working chamber 141. In such a case, the internal pressure PT in the torque converter T becomes constant with respect to the vehicle speed and varies in inverse proportion to only the degree of opening of the throttle. The magnitude of the influence of the degree of opening of the throttle upon the internal pressure PT can be regulated by merely changing the diameter of the plunger 140, and the practical designing of the plunger can be done easily. Since the pressure difference made by the pressure retainer valve 36 decreases as the degree of opening of the throttle increases, the flow rate of pressure oil returning to the torque converter increases, so that the cooling performance is improved.

The pressure retainer valve 36 can be formed by merely providing the existing pressure retainer valve with one plunger 140 additionally. The characteristics of the plunger 140 can be regulated easily by adjusting the thickness alone thereof.

The present invention can be practiced in connection with an automatic transmission using a fluid joint instead of the torque converter T.

The present invention is not, of course, limited to the above embodiments; it may be modified in various ways within the scope of the appended claims.

What is claimed is:

1. In a direct-coupling control system for a fluid gear in an automatic vehicular transmission, having a fluid gear provided with input and output members; a direct-coupling mechanism capable of connecting said input and output members of said input and output members of said fluid gear mechanically and directly by a locking force which is determined on the basis of a function of a difference between a working pressure and an internal pressure in said fluid gear; and a control means provided between a pressure supply source and said direct-coupling mechanism and adapted to control the working pressure, the improvement wherein there is provided a means for controlling the internal pressure in said fluid gear so as to reduce the same in proportion to an increase in a variable selected from the group consisting of vehicle speed and engine output, said internal pressure control means comprising a pressure retainer valve in an intermediate portion of an oil passage connecting said fluid gear with an oil tank, said pressure retainer valve having a valve body urged in a valve-opening direction by the internal pressure in said fluid gear and in a valve-closing direction by an urging member, and a tubular passage for introducing a fluid pressure representative of the selected variable from the group consisting of vehicle speed and engine output and connected to a pressure working chamber to move said valve body in the valve-opening direction.

2. A direct-coupling control system for a fluid gear in an automatic vehicular transmission according to claim 1, wherein said working pressure control means is so formed that the working pressure increases as the vehicle speed increases.

3. A direct-coupling control system for a fluid gear in an automatic vehicular transmission according to claim 2, wherein said working pressure control means is so formed that the working pressure also increases as the engine output increases.

* * * * *